Jan. 18, 1955     G. H. GORDON     2,700,093
INDUCTION HEATING
Filed Jan. 10, 1952     2 Sheets-Sheet 1

GEORGE H. GORDON,
DECEASED.
BY MARY I. H. GORDON,
ADMINISTRATRIX.
BY
Campbell, Brumbaugh, Free & Graves
ATTORNEYS.

Jan. 18, 1955

G. H. GORDON 2,700,093

INDUCTION HEATING

Filed Jan. 10, 1952

GEORGE H. GORDON,
DECEASED.
BY MARY I. H. GORDON,
ADMINISTRATRIX.
BY
Campbell, Brumbaugh, Free & Graves
ATTORNEYS.

United States Patent Office 2,700,093
Patented Jan. 18, 1955

2,700,093

INDUCTION HEATING

George H. Gordon, deceased, late of New York, N. Y., by Mary I. H. Gordon, administratrix, Newburgh, N. Y., assignor to Electric Arc, Inc., Newark, N. J.

Application January 10, 1952, Serial No. 265,794

6 Claims. (Cl. 219—10.77)

The present invention relates to apparatus for generating electric power at high frequencies and more particularly to novel and highly effective means of this character which is capable of generating high frequency electric power in large quantity while affording smooth control of the output energy over a relatively wide range. The invention also has to do with new and improved induction heating apparatus embodying high frequency power generating means of this type.

Controllable sources of high frequency electric power in large quantity are in considerable demand in a number of different industrial applications. In the field of induction heating, for example, high frequency electric power may be employed to energize the induction coil which surrounds the container for the material to be heated. A typical form of high frequency power source used heretofore for this purpose comprises a condenser connected to the high voltage terminals of a power transformer energized from the 60 cycle mains and also connected to discharge through a spark gap in series with the induction coil. Power sources of this type are not entirely satisfactory because the power supplied can be varied only by changing the capacitance of the condenser. Also the noise made by the discharge across the spark gap may be objectionable.

It is an object of the invention to provide new and improved high frequency electric power generating means which is free from the above noted deficiencies of the prior art.

Another object of the invention is to provide new and improved high frequency electric power generating means which is of large capacity yet affords smooth control of the output energy over a relatively wide range.

A further object of the invention is to provide new and improved induction heating apparatus embodying the novel high frequency power generating means of the invention.

These and other objects of the invention are achieved by periodically charging a condenser in an inductance-capacitance resonant circuit through a normally nonconducting gas discharge device which is adapted to be rendered conducting when a signal is impressed upon a control electrode thereof. After each charge, the condenser is discharged by normally nonconducting gas discharge means in the resonant circuit, which is adapted to become conducting when a suitable signal is impressed on control electrode means thereof. The time relation between the signals applied to the control electrode of the charging gas discharge device and the signals impressed upon the control electrode means of the discharging gas discharge means is such that while the condenser is being charged, the discharging gas discharge means is nonconducting and while the condenser is being discharged, the charging gas discharge device is nonconducting.

With this construction, each discharge of the condenser results in the generation in the resonant circuit of a train of waves of frequency dependent upon the total amounts of inductance and capacitance in the circuit. Since the power capacity is a function of the number of times per second the condenser is charged and discharged, substantially stepless power control in the output energy can be achieved by utilizing an adjustable frequency source to provide the signals which are fed to the control electrode of the charging gas discharge device and to the control means of the discharging gas discharge means.

The invention may be better understood from the following detailed description of several typical embodiments thereof, taken in conjunction with the accompanying drawings in which.

Figure 1:
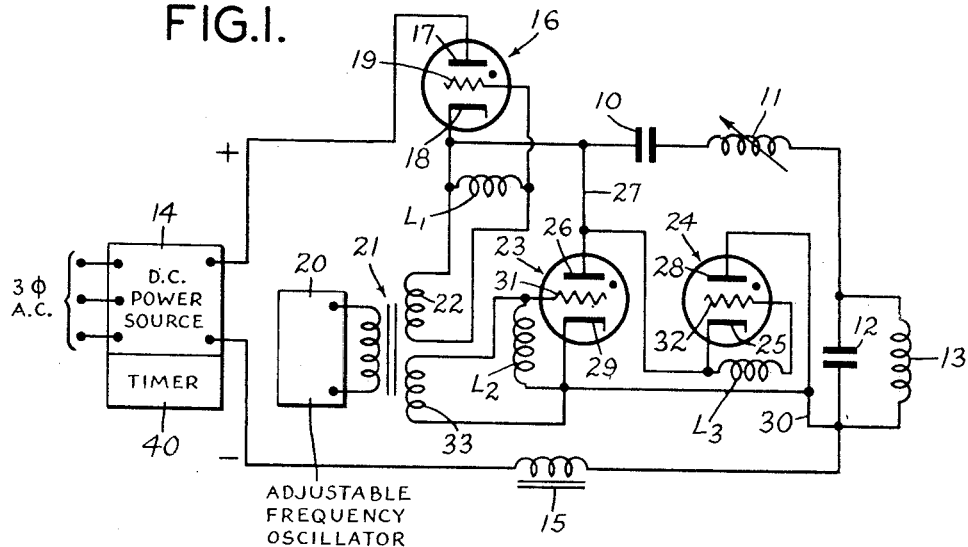
Fig. 1 is a schematic diagram of high frequency power generating means constructed according to the invention.

Fig. 1 illustrates a high frequency electric power generator constructed according to the invention which may be employed for moderate power outputs. Basically, the generator comprises a resonant circuit including a condenser 10 and a variable inductance 11 together with a tank circuit which may include a series condenser 12 and a suitable work coil 13 for utilizing the energy developed in the circuit. The condenser 10 is adapted to be charged periodically by a suitable D. C. source 14 through a charging reactor 15 and a conventional gas discharge tube 16 having a plate electrode 17, a cathode 18 and a control grid electrode 19.

Preferably, the value of the reactor 15 is made such as to result in resonant charging. In this way, the voltage developed across the condenser 10 may be several times the voltage output from the D. C. source 14. The reactor 15 also assists in quenching the charging tube 16. The power source 14 may be, for example, a convenional three-phase full wave rectifier connected to three phase mains as shown, and it should preferably embody filter means for keeping the R. F. produced by the generator out of the power mains. The source 14 may also include conventional settable timer means 40 for automatically shutting off the power after a preset period of time has elapsed.

Normally, the gas discharge tube 16 is nonconducting but it is adapted to be rendered conducting periodically by impressing upon the control grid 19 thereof suitable triggering signals. The latter signals may be provided from a source 20, such as a conventional adjustable frequency, sine wave generator, for example, through a transformer 21 having a secondary winding 22 connected to the cathode 18 and control grid 19 of the gas discharge tube 16, as shown.

After each charging operation, the condenser 10 is adapted to be discharged through the resonant circuit by means of a pair of oppositely connected gas discharge tubes 23 and 24. The cathode 25 of the tube 24 and the plate 26 of the tube 23 are connected together and by a conductor 27 to one side of the condenser 10, as shown. Similarly, the plate 28 of the tube 24 and the cathode 29 of the tube 23 are connected together and by a conductor 30 to the other end of the resonant circuit, as shown.

It is desirable to provide suitable means for suppressing any parasitic voltages developed in the grid firing circuits of the tubes 16, 23 and 24 when the grids thereof are triggered. Such means may comprise, for example, small radio frequency chokes $L_1$, $L_2$ and $L_3$ connected between the cathode 18 and grid 19 of the tube 16, between the cathode 29 and grid 31 of the tube 23, and between the grid 32 and cathode 25 of the tube 24, respectively.

Normally, the gas discharge tubes 23 and 24 are nonconducting but they are adapted to be rendered conducting periodically by the application to the control grids 31 and 32, respectively, of triggering signals that are displaced in time from the triggering signals fed to the grid 19 of the tube 16. Preferably, the firing signals applied to the grids 31 and 32 of the gas discharge tubes 23 and 24, respectively, should be substantially 180° out of phase with the firing signals applied to the control grid 19 of the gas discharge tube 16. Suitable signals of this character may be obtained from another secondary winding 33 on the transformer 21, the connections between the winding 33 and the cathode 29 and control grid 31 of the gas discharge tube 23 being such that the control grids 31 and 19 of the tubes 23 and 16, respectively, will be excited 180° out of phase. By placing the tubes 23 and 24 reasonably close together with the chokes L2 and L3 in the grid-cathode circuits of each as shown, the tube 24 can be fired by induction so that direct connection to the secondary winding 33 of the transformer 21 is not necessary.

Initially, none of the gas discharge tubes 16, 23 and 24 are conducting and no electrical energy is present in the resonant circuit. Upon energization of the circuit shown in Fig. 1, the first positive half wave impressed upon the control grid 19 of the tube 16 from the secondary winding 22 of the transformer 21 will cause the gas discharge tube 16 to become conducting, thereby permitting the condenser 10 to be charged from the D. C. source 14 through the charging reactor 15. When the condenser 10 is fully charged, the tube 16 is automatically extinguished. This takes place within a few microseconds, depending upon the value of the condenser 10 and the time constant of the total charging circuit. During the charging cycle, the signals applied to the control grids 31 and 32 of the gas discharge tubes 23 and 24 are negative, so that they both remain nonconducting.

At the next half wave from the sine wave source 20, the signals applied to the control grids 31 and 32 of the gas discharge tubes 23 and 24 are positive, so that they both become conducting and permit the condenser 10 to discharge in oscillatory fashion through the resonant circuit, thereby generating R. F. electrical wave energy. Since, at this time, the gas discharge tube 16 is extinguished and the signal applied to the control grid 19 thereof is negative, the tube 16 remains nonconducting and none of the R. F. energy developed in the resonant circuit is dissipated in the circuit of the source 20 from which the condenser 10 is charged.

The radio-frequency wave produced and utilized in the tank circuit including the condenser 12 and work coil 13 may be a highly dampened train of waves whose frequency depends upon the total capacitance and inductance in the circuit. It will be noted that the frequency of the R. F. energy generated need have no relation whatsoever to the frequency of the firing signals applied to the control grids of the gas discharge tubes 16, 23 and 24.

The power generated in the resonant circuit is given by the relation $$P = \frac{CV^2N}{2}$$

where $C=$ the capacitance of the condenser 10, $V=$ the voltage to which the condenser 10 is charged, and $N$ is the number of times per second that the condenser is charged and discharged. It will be apparent, therefore, that by adjusting the frequency of the sine wave source 20, stepless power control in the output energy from the resonant circuit can be readily achieved.

The gas discharge tubes 16, 23 and 24 may be conventional mercury vapor thyratrons, provided that the period corresponding to the highest triggering frequency to be used is greater than the deionization time for such tubes. Where higher triggering frequencies are desired, conventional hydrogen thyratrons should be used. These tubes have deionization times of less than 10 microseconds and they are capable of handling large amounts of both steady and peak pulsing power.

Figure 2:
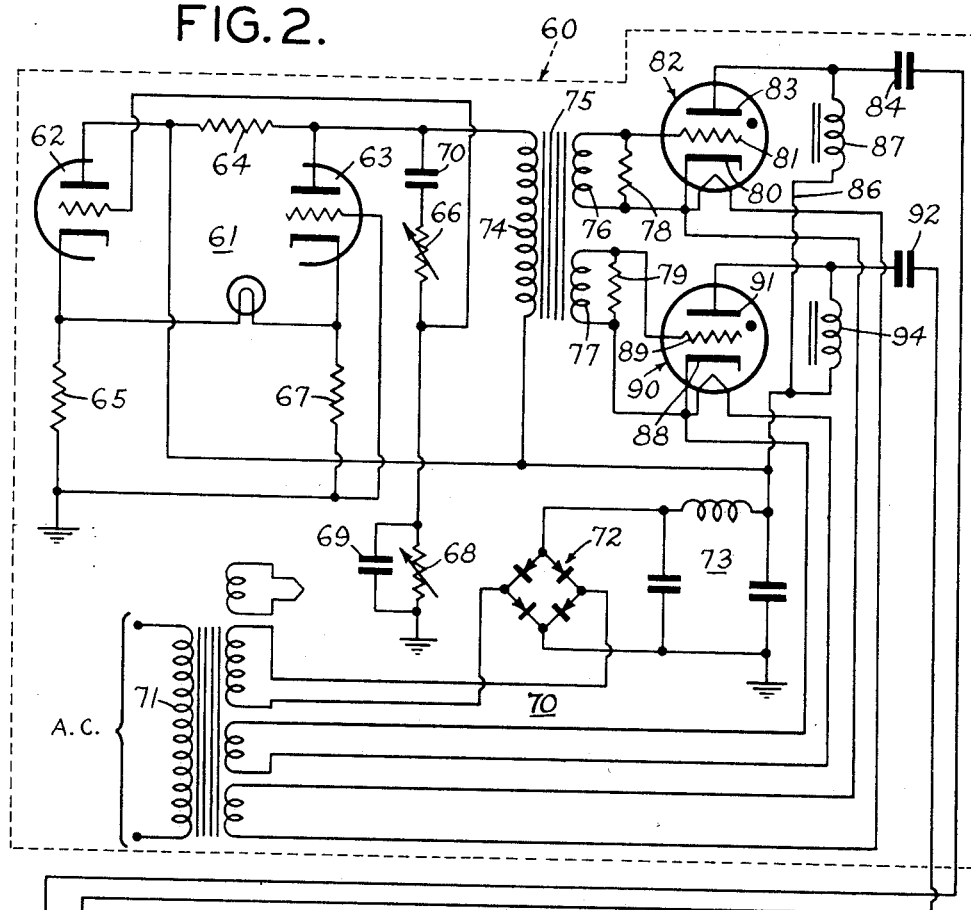
Fig. 2 illustrates schematically another embodiment of the invention adapted for larger outputs than the apparatus shown in Fig. 1.
Figure 2:
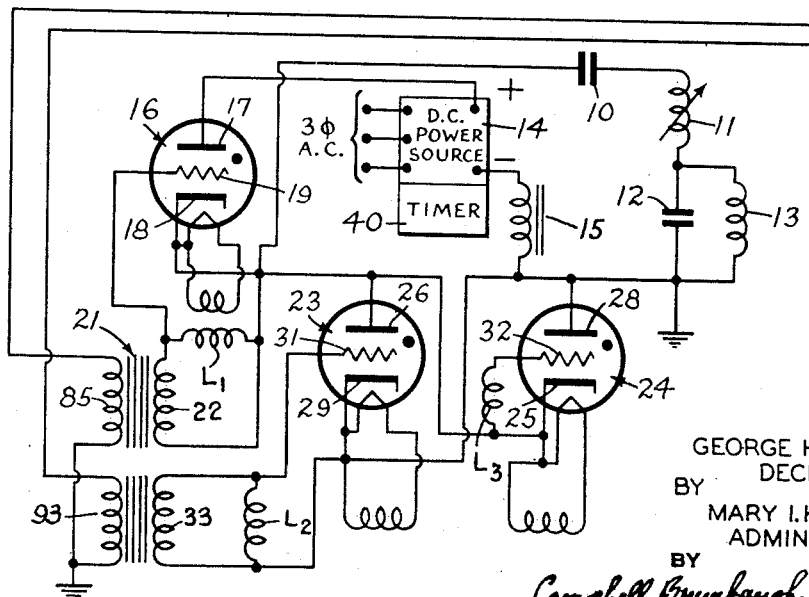

For the larger power capacities, namely those of the order of 10 kw. or above, it is preferred to use a high frequency power generator of the type shown in Fig. 2 of the drawings. In this figure, the resonant circuit and the charging and discharging gas discharge tubes are connected essentially in the manner shown in Fig. 1 and like parts have been designated by like reference characters. However, the tubes 16, 23 and 24 are grid controlled hydrogen thyratron tubes capable of handling the power involved. The charging current for the condenser 10 is supplied from the high voltage D. C. source 14.

As shown in greater detail in Fig. 2, the signals for firing the gas discharge tubes 16, 23 and 24 are provided by a variable frequency triggering unit 60. The triggering unit 60 comprises an oscillator 61 having an output that is variable in frequency over a range from say 200 to 10,000 cycles per second. The oscillator 61 may be of the Wien bridge type, for example, including a pair of electron tubes 62 and 63 connected to the resistors 64, 65, 66, 67 and 68 and to the condenser 69 and 70 as shown in Fig. 2. An oscillator of this type is very stable since it has no temperature sensitive inductance therein. Power for the oscillator 61 may be provided by a self-contained power supply 70 which may comprise, for example, the usual power transformer 71, full wave rectifier means 72 and conventional filter means 73.

The A. C. output from the oscillator 61 is impressed upon the primary winding 74 of a transformer 75 having two secondary windings 76 and 77 which may be shunted by load resistors 78 and 79, respectively. The secondary winding 76 is connected to the cathode 80 and to the grid 81 of a conventional gas discharge tube 82 which may be for, example, a low hydrogen thyratron tube. The plate 83 of the tube 82 is connected in series with a condenser 84 to one primary winding 85 of the transformer 21 in the R. F. generator circuit. The condenser 84 is adapted to be charged from the output of the power supply filter 73 through a conductor 86 and a charging reactance 87.

In similar fashion, the secondary winding 77 of the transformer 75 is connected to the cathode 88 and grid 89 of a gas discharge tube 90 which may also be a hydrogen thyratron, for example. The plate 91 of the tube 90 is connected in series with a condenser 92 to a second primary winding 93 on the transformer 21 and the condenser 92 is adapted to be charged from the power supply 70 through the conductor 86 and a charging reactor 94.

As shown in Figure 2 the core of transformer 21 is divided into two magnetically separate parts as shown, to provide independent action between the windings 22 and 33.

The secondary windings 76 and 77 of the transformer 75 are so connected that when the signal on the grid 81 of the tube 82 is positive, the signal applied to the grid 89 of the tube 90 is negative and vice versa. With this construction, the tubes 82 and 90 serve to discharge the condensers 84 and 92 through the primary windings 85 and 93, respectively, of the transformer 21 thereby producing alternate D. C. pips which are utilized to fire sequentially first the gas discharge tube 16 and then the two gas discharge tubes 23 and 24 in the resonant circuit. After discharge, the condensers 84 and 92 are recharged in the known manner through the charging reactors 87 and 94, respectively.

In the operation of the apparatus shown in Fig. 2 when energized, the tubes 16, 23 and 24 are initially nonconducting, the rectifier 14 supplies high voltage D. C. to the plate of the gas discharge tube 16, and the condensers 84 and 92 are charged through the charging reactors 87 and 94. When a positive pulse is next applied to the grid 81 of the tube 82 from the oscillator 61, the condenser 84 is discharged, resulting in the application of a sharp, positive D. C. pip to the grid of the gas discharge tube 16, which causes it to become conducting. Since a negative signal is being applied to the grid 89 of the tube 90 at this time, it remains nonconducting, as do the tubes 23 and 24. The condenser 10 in the resonant circuit is now charged by the D. C. source 14 through the charging reactor 15. When the condenser 10 is fully charged, the gas discharge tube 16 is extinguished and becomes nonconducting.

As soon as a positive signal is next applied to the grid 89 of the gas discharge tube 90 from the oscillator 61, the condenser 92 is discharged, resulting in the application of a positive high voltage D. C. pip to the grid of the gas discharge device 23 so that the latter becomes conducting. By induction, a positive D. C. pip is also applied to the grid of the gas discharge device 24 so that it also becomes conducting. This causes the condenser 10 to be discharged through the resonant circuit, producing a highly damped R. F. wave which is supplied to the tank circuit including the condenser 12 and the work coil 13. The tube 16 at this time is nonconducting since the tube 82 has been extinguished and a negative signal is being applied to the grid thereof. As soon as the oscillatory discharge has ceased, the gas discharge tubes 23 and 24 again become nonconducting and the cycle is repeated.

It will be apparent that by controlling the frequency of the oscillator 61, the power capacity of the high frequency generator in Fig. 2 can be adjusted smoothly over a very wide range.

Figure 3:
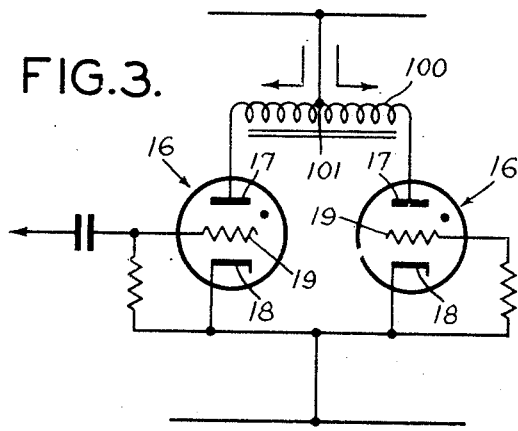
Fig. 3 is a schematic diagram of parallel connected gas discharge devices which may be employed in high frequency power generating means according to the invention.

It will be understood that by employing a plurality of series connected gas discharge devices in place of each of the tubes 16, 23 and 24 very high voltages and powers can be developed. Also, higher currents can be handled by substituting for each of the tubes 16, 23 and 24 a plurality of gas discharge tubes connected in parallel. In such case, however, provision must be made to insure that the two tubes fire simultaneously. This may be accomplished, as shown in Fig. 3, by connecting the cathodes 18 of the tubes together and by connecting the plates 17 to the opposite ends of a balanced reactor 100, the connection to the D. C. source 14 being made through a center tap 101 on the reactor 100. The firing signal should preferably be impressed on the grids 19 of both tubes, as shown.

One important application of the R. F. power generator apparatus of the invention lies in the field of induction heating. In such application, the work coil 13 in Figs. 1 and 2 may be the heating coil which surrounds the container for the material to be heated. The heating time can be preset by proper adjustment of the timer 40 in the usual manner.

Since the individual wave trains produced in the R. F. generating circuit are of only a few microseconds duration and are separated by time intervals of relatively long duration, the power output can be increased by generating a plurality of sequences of wave trains properly phased with respect to each other so as to fill in the aforementioned separation time interval between adjacent wave trains. One way of accomplishing this result would be to provide a plurality of R. F. generators of the type shown in Fig. 1 or Fig. 2, the damped waves developed by each being properly shifted in phase with respect to each other to effect the desired result and to couple the outputs of the generators to a common work coil. Alternatively, multiple charging tubes 16 and discharging tubes 23 and 24 might be employed in a single resonant circuit, with means for pulsing the respective control grids of the tubes in the proper relations to insure the desired results.

In a practical R. F. generator of the type shown in Fig. 2, the circuit components might have the following values, for example:

Condenser 10, .03 mfd.
Inductance 11, adjustable 0–25 $\mu$ henries.
Condenser 12, .1 mfd.
Charging reactor 15, .25 henry.
Inductance 13 may be a conventional induction heating coil designed for substantial resonance with the condenser 12.

The invention thus provides novel and highly effective means for generating high frequency alternating current power in large quantity. By using grid controlled gas discharge devices to charge and discharge a condenser in a resonant circuit, the desired R. F. power can be obtained without undesirable noise and without dissipation of the R. F. power in the D. C. charging circuit. Further, by providing for adjustment of the frequency of the firing signal for the gas discharge tubes as described, substantially stepless control in the power output of the apparatus can be obtained.

It will be readily apparent that the several embodiments described above by way of illustration are susceptible of modification in form and detail within the spirit of the invention. For example, other types of gas discharge devices such as mercury vapor thyratrons may be employed if the power requirements are not very large. The invention, therefore, is not to be regarded as limited to the specific embodiments described but is to be thought of as broadly as the appended claims will allow.

What is claimed is:

1. In apparatus for producing induction heating, the combination of a plurality of resonant electrical circuits, each including a separate inductance and capacitance means, a source of electrical energy, first switching means for connecting said source periodically to said capacitance means to charge the same, and second switching means including a pair of suitable tubes connected as defined herein and operated in cycles 180 degrees apart and in timed relation to said first switching means for charging and discharging said capacitance periodically through their resonant circuits, said first and second switching means including special gas discharge devices comprising hydrogen thyratron tubes having a positive pulse grid control.

2. In apparatus for producing induction heating, the combination of a plurality of resonant electrical circuits, each including a separate inductance and capacitance means, a source of electrical energy, first switching means for connecting said source periodically to said capacitance means to charge the same, and second switching means including a pair of suitable tubes connected as defined herein and operated in cycles 180 degrees apart and in timed relation to said first switching means for charging and discharging said capacitance periodically through their resonant circuits, said first and second switching means comprising tubes having a deionization time of less than ten microseconds, whereby the power input and output both are better controlled.

3. Apparatus for producing induction heating including, an A. C. main primary control circuit, a high voltage rectifier and filter means connected to said circuit, a variable frequency triggering unit also connected to said circuit and a charging generator unit interconnected between the triggering unit and the rectifier means, said triggering unit including an oscillator arrangement having an output that can be varied in a stable manner over a wide range such as 200 to 10000 cycles per second, a transformer having a primary winding connected to said oscillator and a secondary winding in two parts, a gas discharge control tube of the hydrogen thyratron type having its cathode and grid connected to one part of said secondary winding and another gas discharge tube having its cathode and grid connected to the other part of such secondary winding, these secondary windings being so connected that when a signal on the grid of one of said tubes is positive the signal on the other tube is negative, the plates of said tubes being individually connected to separate charging reactances and associated condensers, said reactances being connected to said rectifier and filter means, the output side of the condenser connected to the first mentioned discharge tube being connected to the primary of an auxiliary transformer, a power gas tube of the hydrogen thyratron type having its grid and cathode connected to the secondary of the said auxiliary transformer while its plate is connected to a D. C. power supply, a second auxiliary transformer having its primary connected to the plate condenser of the second mentioned control tube, a pair of gas tubes of the hydrogen thyratron type having the plate of one connected to the cathode of the other and also to the cathode of said power tube while its grid and cathode are connected across the secondary of said auxiliary transformer, and the plate of the second of said pair of tubes being connected to the cathode of the first of said pair of tubes, a tank arrangement including a work coil to transmit heat to the device to be heated and a parallel connected condenser being connected to the plate of said last mentioned tube of the said pair, and also to a charging reactor connected to a negative power supply, a variable inductance and a condenser connected in series with the tank arrangement while the condenser is connected to the cathode of the power tube, said tubes and interconnected parts as described acting to deliver a high frequency current to the work coil in the tank circuit.

4. Apparatus for producing induction heating including, a pair of hydrogen thyratron triggering tubes, a transformer having a primary and two secondary windings one of which is connected across the grid and cathode of one of said triggering tubes while the other secondary winding is connected across the grid and cathode of the second triggering tube, said windings delivering their outlet to their respective tubes 180° apart, an oscillator arrangement having its outlet connected to the primary of said transformer and delivering thereto a voltage which can be varied in a stable manner over a wide range of frequency, each of said triggering tubes having their own plates connected directly to a cooperative reactor and condenser, a high voltage rectifier and filter operatively connected to the ends of said reactors opposite to their ends connected to their cooperative condensers, a power tube preferably of hydrogen thyratron type, a pair of cooperative hydrogen thyratron tubes having a plate of one connected to the cathode and grid of the other and to the cathode of said power tube, a transformer having a pair of primary and secondary windings, one of its secondaries being connected across the cathode and grid of said power tube while its primary is connected between ground and the condenser connected to the associated plate of the first mentioned triggering tube, the second primary winding of the transformer being connected between ground and the condenser of the second mentioned triggering tube while its associated secondary is connected to the grid and cathode of the tube, the plate of which is connected to the cathode of the power tube, a tank circuit comprising an inductance and condenser in parallel therewith and having one end thereof connected to the plate to the second mentioned tube of said last mentioned pair while the other end is connected to an adjustable inductance and that in turn is connected to a condenser the opposite side of which is connected to the cathode of the power tube, a charging reactor connected to the negative side of the source of D. C. power and to the plate of the tube which is connected to the tank arrangement, said power tube acting to cause power to be applied to said pair of tubes according to the timed relation of the impulses conveyed thereto by the said triggering tubes.

5. Apparatus for producing heat by induction as set forth in claim 3 further defined in that said secondary windings connected to said triggering tubes, each may have a load resistor in shunt therewith as and for the purpose described.

6. Apparatus for producing heat by induction as set forth in claim 4 further defined in that means are provided for suppressing any parasitic voltages that may be developed in the grid firing circuits of the power tube and its directly associated pair of tubes when the grids thereof are triggered, said means comprising radio frequency choke coils connected between the cathode and grid of the power tube and between the grids and cathodes of the pair of tubes interconnected with the power tube.

References Cited in the file of this patent
UNITED STATES PATENTS

| | | |
|---|---|---|
| 2,078,151 | Miles | Apr. 20, 1937 |
| 2,085,100 | Knowles | June 29, 1937 |
| 2,103,371 | Miller | Dec. 14, 1937 |
| 2,235,385 | Rava | Mar. 18, 1941 |
| 2,287,542 | Vang | June 23, 1942 |
| 2,473,915 | Slepian et al. | June 21, 1949 |
| 2,564,578 | Loughren | Aug. 14, 1951 |